July 20, 1954  L. K. EDWARDS  2,684,217
FUEL DISTRIBUTION CONTROL FOR AIRCRAFT
Filed June 29, 1950
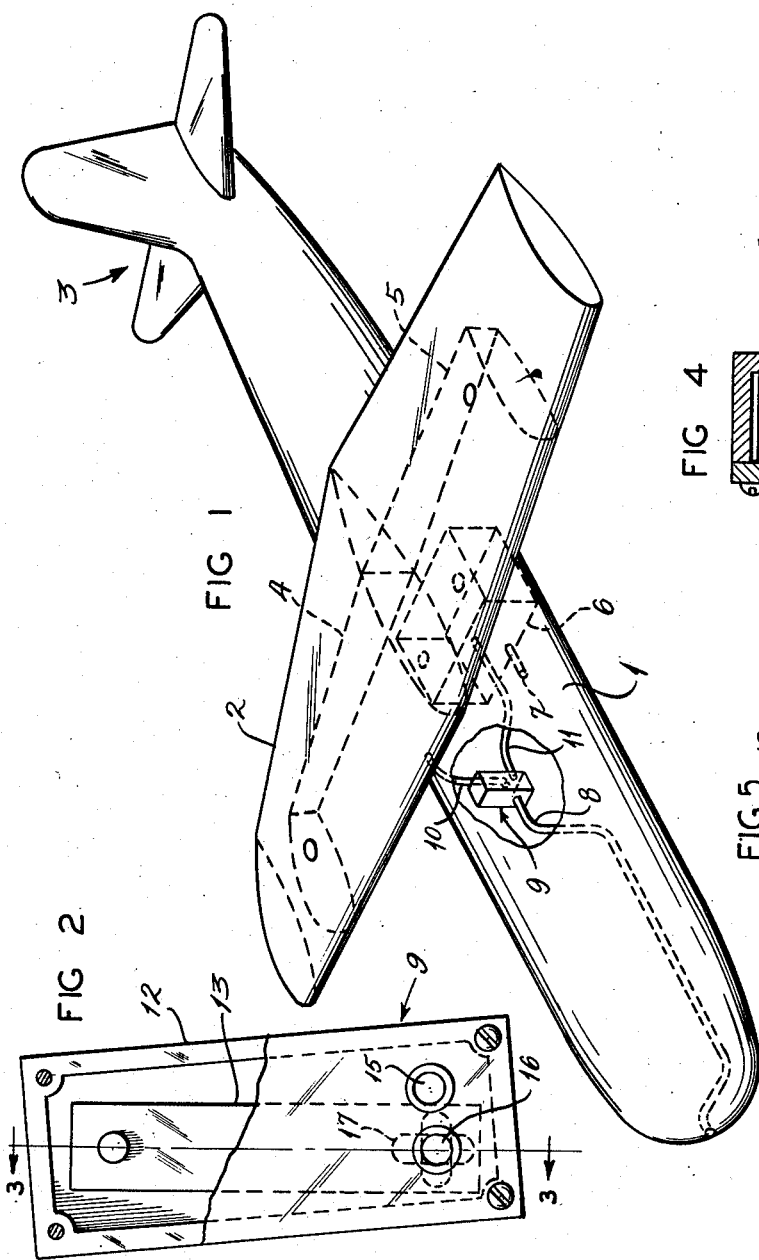
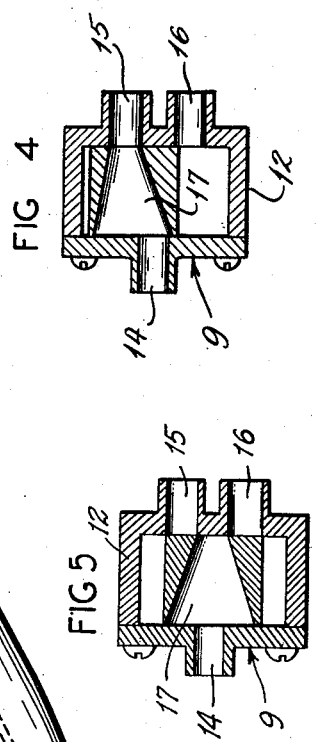
INVENTOR:
LAWRENCE K. EDWARDS,
ATTORNEYS.

Patented July 20, 1954

2,684,217

UNITED STATES PATENT OFFICE 2,684,217

FUEL DISTRIBUTION CONTROL FOR AIRCRAFT

Lawrence K. Edwards, Glendale, Mo., assignor to McDonnell Aircraft Corporation, St. Louis, Mo., a corporation of Maryland Application June 29, 1950, Serial No. 171,101

4 Claims. (Cl. 244—135)

This invention relates to aircraft having a plurality of fuel tanks therein, and is more particularly directed to mechanism for holding the aircraft in equilibrium during flight as fuel is being drawn from the fuel tanks.

The primary object of the invention is to provide control means for regulating the flow of fuel from the fuel tanks in order to maintain the aircraft in equilibrium.

Another object of the invention is to provide a gravity responsive control valve for regulating the withdrawal of fuel from the fuel tanks for maintaining the aircraft in balance under all flight conditions.

The invention consists in the provision of fuel tanks for aircraft that are either permanently installed therein or may be jettisoned and in which the fuel is subject to ram air pressure, this pressure being selectively applied to either of the fuel tanks by a gravity responsive valve that selects the tank from which fuel is withdrawn for the purpose of maintaining the aircraft in equilibrium.

In the drawings:

Fig. 1 is a perspective view of an aircraft incorporating the invention,

Fig. 2 is an enlarged front view of the inertia responsive valve,

Fig. 3 is a sectional view taken along the line 3—3 of Fig. 2,

Fig. 4 is a sectional view taken along the line 4—4 of Fig. 3; and

Fig. 5 is a view like Fig. 4 but illustrating the valve in normal flight position.

In the drawings the numeral 1 designates the fuselage of a pilotless or pilot-operated type of aircraft having a wing 2 and the usual control surfaces in an empennage, generally indicated at 3. The fuel tanks 4 and 5 are mounted in the wing 2 so that they may be jettisoned if desired. A sump 6 is mounted in the fuselage and is interiorly connected to each of the fuel tanks. A conduit 7 is connected to the sump and supplies fuel to the fuel pump (not shown) as is customary in the art.

Fuel will drain uniformly from tanks 4 and 5 when the aircraft is experiencing normal flight. When the aircraft banks to the right or to the left, fuel will be drained from one tank only. It is also possible to drain fuel from one tank faster than from the other, thereby disturbing the equilibrium of the aircraft after it resumes normal flight, thus rendering it unstable. The direction in which the aircraft banks will determine the degree and amount of unbalance of the aircraft. This unbalance is corrected by applying ram pressure to the heavy one of the tanks which is usually the tank containing the most fuel, thereby restoring the equilibrium of the aircraft. An open-ended or Pitot tube 8 is disposed in the fuselage and projects therefrom. This tube is connected to an inertia responsive valve 9 which selectively applies ram pressure to the tanks 4 and 5 through tubes 10 and 11, respectively. This valve consists of a housing 12 secured to a fixed part on the aircraft, and in which a pendulum 13 is pivotally mounted. The tube 8 is connected to a port 14 in housing 12 and outlet ports 15 and 16 are formed in the housing opposite the inlet port 14. The pendulum 13 has a tapering or converging aperture 17 therein alignable with either of the ports 15 or 16, thereby selectively applying ram pressure to the tubes 10 or 11 and thence to either of the fuel tanks 4 or 5. The aperture 17 is so shaped that it will converge upon either of the outlet ports 15 or 16, and always be in communication with port 14. During normal flight conditions the pendulum centers itself in the housing so that ram air pressure does not pass through the valve, since the converging aperture 17 lies between the outlet ports 15 and 16, as seen in Fig. 5.

When the aircraft banks or tips to either side due to unbalanced fuel tanks, the pendulum 13 and housing 12 will have relative movement, positioning the free end of the pendulum by the action of gravity in the low side of the housing and the aircraft. This will permit the application of ram pressure to the lowermost of the fuel tanks and force fuel therefrom until equilibrium is restored, after which the same amount of fuel is withdrawn from both tanks, thus maintaining the same weight of fuel in each and, as a result, the aircraft will be in balance or in equilibrium.

What I claim is:

1. In a fuel system for controlling the lateral equilibrium of aircraft, an aircraft having fuel tanks on opposite sides of the longitudinal axis thereof about which lateral movement occurs, said system including a valve in the nature of a pendulum responsive to gravitational action, a housing enclosing said pendulum valve, tubes extending between said housing and each of said tanks; and a tube directing ram pressure into said valve housing, said pendulum moving in said housing in response to lateral unbalance due to fuel tanks of unequal content the aircraft turns or banks for selectively applying ram pressure to the tank which contains the most fuel to accelerate fuel withdrawal therefrom and proportionately retarding fuel withdrawal from the unpressurized tanks, thus restoring the equilibrium of the aircraft.

2. In a fuel feeding system for aircraft comprising a fuselage and wings, the combination of a pair of fuel tanks in said wings located on opposite sides of the longitudinal axis of said fuselage, a valve housing fixed in said fuselage, a passageway for fuel flow toward the longitudinal axis of said fuselage from each of said tanks, connections between said tanks and said valve housing, means applying ram air pressure into said housing and through said connections into said tanks; and a pendulum valve swingably mounted in said housing, said housing moving relative to the gravitational position of said pendulum valve and in response to lateral unbalance due to the fuel tanks being unequal in content, and in a direction for directing ram air pressure to the tank having the greater amount of fuel therein for accelerating fuel flow from the tank having the greater amount of fuel toward the longitudinal axis, thus restoring the equilibrium of the aircraft.

3. In a fuel distribution control for aircraft, an aircraft having fuel tanks on opposite sides of the longitudinal axis thereof, sump means for withdrawing fuel from all of the fuel tanks, a housing carried by the aircraft to move therewith in accordance with the lateral movement of the aircraft, spaced ports in said housing, conduits connecting said spaced ports with the fuel tanks, a single port in said housing remote from said spaced ports, a conduit for conducting ram air from the exterior of the aircraft to said single port, and a pendulum mounted in said housing for movement relative to said housing and laterally of the longitudinal axis of the aircraft, said pendulum being movable between said spaced ports and single port, and said pendulum having a port therethrough to control delivery of ram air to one of the fuel tanks through selection of one of said spaced ports resulting from movement of the pendulum due to lateral movement of the aircraft, for applying ram air pressure on the fuel in the selected fuel tank to accelerate fuel flow out of the selected fuel tank.

4. In fuel distribution control as set forth in claim 3, the combination wherein said pendulum port is tapering from an inlet end having communication with said single port in all positions of relative movement of said pendulum and housing, and the outlet end is, at times, out of communication with said spaced ports for the condition of substantially zero lateral movement of the aircraft about its longitudinal axis.

References Cited in the file of this patent

UNITED STATES PATENTS

| Number | Name | Date |
|---|---|---|
| 730,107 | Gibon | June 2, 1903 |
| 1,581,595 | Osborne | Apr. 20, 1926 |
| 2,124,867 | Akerman | July 26, 1938 |
| 2,366,146 | Martin-Hurst | Dec. 26, 1944 |
| 2,382,412 | Grey et al. | Aug. 14, 1945 |
| 2,403,749 | O'Neal | July 9, 1946 |
| 2,409,245 | Black | Oct. 15, 1946 |
| 2,509,629 | De Giers et al. | May 30, 1950 |